United States Patent
Fu

(10) Patent No.: US 10,255,815 B2
(45) Date of Patent: Apr. 9, 2019

(54) METHOD AND CONTROL UNIT FOR MONITORING THE LANE OF A VEHICLE

(71) Applicant: Robert Bosch GmbH, Stuttgart (DE)

(72) Inventor: Chengxuan Fu, Kirchheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 51 days.

(21) Appl. No.: 15/512,188

(22) PCT Filed: Jul. 31, 2015

(86) PCT No.: PCT/EP2015/067642
§ 371 (c)(1),
(2) Date: Mar. 17, 2017

(87) PCT Pub. No.: WO2016/050386
PCT Pub. Date: Apr. 7, 2016

(65) Prior Publication Data
US 2017/0287336 A1 Oct. 5, 2017

(30) Foreign Application Priority Data
Sep. 29, 2014 (DE) .................. 10 2014 219 689

(51) Int. Cl.
*B60W 50/14* (2012.01)
*G08G 1/16* (2006.01)
(Continued)

(52) U.S. Cl.
CPC ........... *G08G 1/167* (2013.01); *B60W 10/184* (2013.01); *B60W 10/20* (2013.01); *B60W 30/12* (2013.01);
(Continued)

(58) Field of Classification Search
CPC .... B60W 10/184; B60W 10/20; B60W 30/12; B60W 50/0097; B60W 50/14;
(Continued)

(56) References Cited

U.S. PATENT DOCUMENTS 8,219,298 B2 * 7/2012 Nishira .............. B60K 31/0008
701/1
8,392,104 B2 * 3/2013 Nishira .................... B60T 7/22
180/280
(Continued)

FOREIGN PATENT DOCUMENTS

DE 102004045103 A1 3/2006
EP 1422111 A2 5/2004
(Continued)

OTHER PUBLICATIONS

International Search Report for PCT/EP2015/067642, dated Jan. 29, 2016.

*Primary Examiner* — McDieunel Marc
(74) *Attorney, Agent, or Firm* — Norton Rose Fulbright US LLP; Gerard Messina

(57) ABSTRACT

A method and a control unit for monitoring the lane of a vehicle, including the steps of ascertaining at least one lane characteristic, ascertaining at least one driving situation variable representing the instantaneous driving situation of the vehicle in an instantaneous position, as well as ascertaining at least one approach variable in a subsequent position of the vehicle. The approach variable is ascertained from the at least one lane characteristic, as well as from the at least one driving situation variable.

17 Claims, 3 Drawing Sheets

(51) Int. Cl.
*B60W 50/00* (2006.01)
*B60W 10/184* (2012.01)
*B60W 10/20* (2006.01)
*B60W 30/12* (2006.01)
*G08G 1/01* (2006.01)
*B60W 30/09* (2012.01)

(52) U.S. Cl.
CPC ........ *B60W 50/0097* (2013.01); *B60W 50/14* (2013.01); *G08G 1/0112* (2013.01); *B60W 30/09* (2013.01); *B60W 2050/143* (2013.01); *B60W 2520/10* (2013.01); *B60W 2520/14* (2013.01); *B60W 2550/146* (2013.01); *B60W 2710/207* (2013.01); *B60W 2720/10* (2013.01)

(58) Field of Classification Search
CPC ........... B60W 30/09; B60W 2050/143; B60W 2250/10; B60W 2250/14; B60W 2250/146; B60W 2710/207; B60W 2720/10; B60W 40/02; G08G 1/167; B60K 31/0008; B60T 7/22; B62D 15/025; G06T 7/223
See application file for complete search history.

(56) References Cited

U.S. PATENT DOCUMENTS

| | | | |
|---|---|---|---|
| 9,605,971 B2 * | 3/2017 | Niehsen | B62D 15/025 |
| 9,658,620 B1 * | 5/2017 | Urmson | G06T 7/223 |
| 2004/0107030 A1 * | 6/2004 | Nishira | B60W 40/02 |
| | | | 701/36 |
| 2007/0069874 A1 | 3/2007 | Huang et al. | |
| 2007/0100551 A1 | 5/2007 | Ishikura | |
| 2011/0231062 A1 | 9/2011 | Kim | |

FOREIGN PATENT DOCUMENTS

| | | |
|---|---|---|
| EP | 2535882 A1 | 12/2012 |
| JP | 2004038487 A | 2/2004 |
| JP | 2010052716 A | 3/2010 |

* cited by examiner

METHOD AND CONTROL UNIT FOR MONITORING THE LANE OF A VEHICLE

FIELD OF THE INVENTION

The present invention relates to a method and a control unit for monitoring the lane of a vehicle.

BACKGROUND INFORMATION

The unexamined patent application DE102004057296 A1 discusses a driver assistance device for warning a driver of a motor vehicle of an imminent departure from the roadway or a departure from the lane. The device includes at least one imaging sensor, an evaluation device connected to the imaging sensor for detecting roadside markings and/or lane markings and/or edges of lanes in the area detected by the imaging sensor, as well as a warning device, which is connected to the evaluation device.

In such systems, the departure from a lane is detected with the aid of a video camera, based on lane markings or lane boundaries, for example, based on a curbside. The driver is warned when he/she unintentionally departs from the lane.

The warning may be triggered based on two variables: DLC (distance to line crossing) or TLC (time to line crossing). One problem in triggering via the variable DLC, via the distance of the vehicle to the lane boundary, is that the driver is variously warned depending on how fast the vehicle drifts to the boundary. Latencies in the overall vehicle system of several hundred microseconds result in a warning—for example, a sound signal or a vibration of a steering wheel—which is late or delayed in reaching the driver. If the vehicle drifts rapidly away, it may be that the warning occurs only when the vehicle has already crossed the lane boundary.

In the second approach TLC (time to line crossing), in which the time until the lane boundary is crossed is used, the warning point in time is adjusted as a function of the lateral velocity. In these calculations, the curvature of the lane is in part not taken into consideration. It may be that as a result, the warning for the inside of the curve is often triggered too late and the warning for the outside of the curve is often triggered too early.

SUMMARY OF THE INVENTION

An object of the present invention is to provide a simple and robust calculation of the approach of the vehicle to roadway boundaries.

In the method for monitoring the lane of a vehicle, at least one lane characteristic is ascertained in a first step. In a second step, at least one driving situation variable representing the instantaneous driving situation of the vehicle in an instantaneous position is ascertained. In addition, at least one approach variable in a subsequent position of the vehicle is ascertained from the at least one lane characteristic and from the at least one driving situation variable.

With the method according to the present invention, it is possible to predict a future vehicle position in relation to the lane boundaries. In other words, therefore, a prediction of the vehicle movement takes place based on the instantaneous vehicle situation while taking the roadway characteristics into consideration. With these predictions, it is possible to project/predict approach variables, i.e. distances to the roadway boundaries in the subsequent position of the vehicle.

This prediction has the advantage that based on an instantaneous driving situation, it may already be detected how an approach to roadway boundaries may appear at a subsequent point in time. This enables a prompt reaction if, for example, this approach is to be a critical approach. Critical could be, for example, if in the subsequent position the vehicle clearly crosses over the roadway boundary and heads into oncoming traffic, for example. A warning/informing of the driver without the prediction mechanism according to the present invention could be too late for an intervention. The prediction mechanism optimizes the warning time point and/or intervention point in time and thereby enhances the safety during use of the vehicle.

The control unit according to the present invention for carrying out the method according to the present invention includes a first subunit for ascertaining at least one lane characteristic, a second subunit for ascertaining at least one driving situation variable representing the instantaneous driving situation of the vehicle in an instantaneous position, as well as a third subunit for ascertaining at least one approach variable in a subsequent position of the vehicle from the at least one lane characteristic and from the at least one driving situation variable.

In one advantageous embodiment, the at least one ascertained approach variable is also compared to a threshold value and an information variable is output as a function of the comparison of the approach variable with the threshold value. Based on this comparison, it may be ascertained whether the approach variable, which is a measure of the approach of the vehicle to the roadway boundary, assumes a critical value, in order to thus take potential actions.

In an embodiment of the method, the approach variable is ascertained predictively. A prediction length or a prediction time is used as a parameter for predictively determining the at least one approach variable.

Thus, an estimation is made as to where the vehicle will be located in relation to the lane boundaries after a certain prediction time. With the aid of the suitably selected prediction time or of the correctly adjusted prediction length, actions may be promptly taken in the event the approach of the vehicle to the lane boundaries becomes critical. To take action only in the case of direct approach could be too late due to high latencies in the overall vehicle system. A warning may be output if the vehicle were to approach the lines too closely after the prediction time. The warning may also occur in the form of a change of the steering torque via a function of the so-called lane departure prevention.

Since the prediction length and prediction time are linked to one another via the ego-velocity of the vehicle, the specifications of the method for lane monitoring may be advantageously made by specifying a time or also by specifying a length. The wheelbase of the vehicle may be taken into consideration in the process.

According to one advantageous embodiment of the method, the prediction length or the prediction time is variably adjustable, in particular, by a driver of the vehicle. This enables the driver to adjust the system in order to adapt it to his/her individual driving behavior and to his/her habits. If, for example, a driver wishes to be warned less early, because he/she has a sportier driving style, the prediction length may then be set to be shorter, which is accompanied by a later warning.

The at least one approach variable is advantageously ascertained as a function of the instantaneous distance of a coordinate system of the vehicle at the instantaneous position relative to at least one of the coordinate systems of a roadway boundary. In addition, at least one instantaneous angle of the coordinate system of the vehicle at the instantaneous position relative to at least one of the coordinate systems of the roadway boundary is taken into consideration. The curvature of at least one roadway boundary and the curvature change of at least one roadway boundary are also used as lane characteristics.

In another embodiment, the at least one approach variable may be ascertained as a driving situation variable as a function of
   the instantaneous curvature of a vehicle trajectory, and
   the instantaneous curvature change of the vehicle trajectory,
the instantaneous curvature being a function of the instantaneous velocity and of the instantaneous yaw rate of the vehicle. With the driving situation variables, the ego-motion of the vehicle in the instantaneous state is taken into consideration when predictively determining the approach variable.

In another embodiment, at least two approach variables are determined, a first approach variable being assigned to a first roadway boundary and a second approach variable being assigned to a second roadway boundary. Thus, a function with enhanced safety is possible compared to the ascertainment of only one approach variable, since both roadway boundaries may be predictively monitored and thus an approach of the vehicle to roadway boundaries on both sides of the vehicle is taken into consideration.

The smaller approach variable of the first and second approach variables may be ascertained and this smaller approach variable may be compared to the threshold value. Thus, the information variable of the system is output only with respect to the more critical side of the two roadway boundaries.

The first approach variable and the second approach variable may be provided as output variables to a lane-keeping system and are used as input variables for this system.

In one advantageous embodiment, the at least one lane characteristic is detected with the aid of at least one sensor. This sensor has a detection range with a certain expanse. The prediction length may be altered, in particular, reduced as a function of the expanse of the detection range of the sensor. If the detection width or length of the sensor is altered, it is not always immediately possible to reliably gauge and detect the lane boundary. In order to accommodate these altered conditions, it is possible to appropriately adapt the prediction length.

In one embodiment of the control unit according to the present invention, the at least one approach variable is compared to a threshold value using a third subunit, and using an output unit, an information variable is output as a function of the comparison of the approach variable to the threshold value. This enables an information variable, which indicates this state, to be output, after estimating whether the approach variable falls within a critical range. In additional systems, or even in the same system, additional actions may be initiated based on the information variable. A steering intervention or braking intervention may occur, on the one hand. Alternatively or in addition, a driver information may be initiated, for example, in the form of a targeted vibrating of the steering system, in particular, of the steering wheel, of a visual signal and/or of an acoustic signal as well. A piece of information regarding the fatigue of the vehicle driver may also be triggered as a function thereof.

According to another embodiment, two approach variables are ascertained in the third subunit. In addition, the smaller approach variable of the first approach variable and second approach variable is ascertained in an intermediate unit. This smaller approach variable is then compared to the threshold value. An information variable is output in an output unit, again as a function of the comparison of the approach variable to the threshold value.

DETAILED DESCRIPTION

Figure 2:
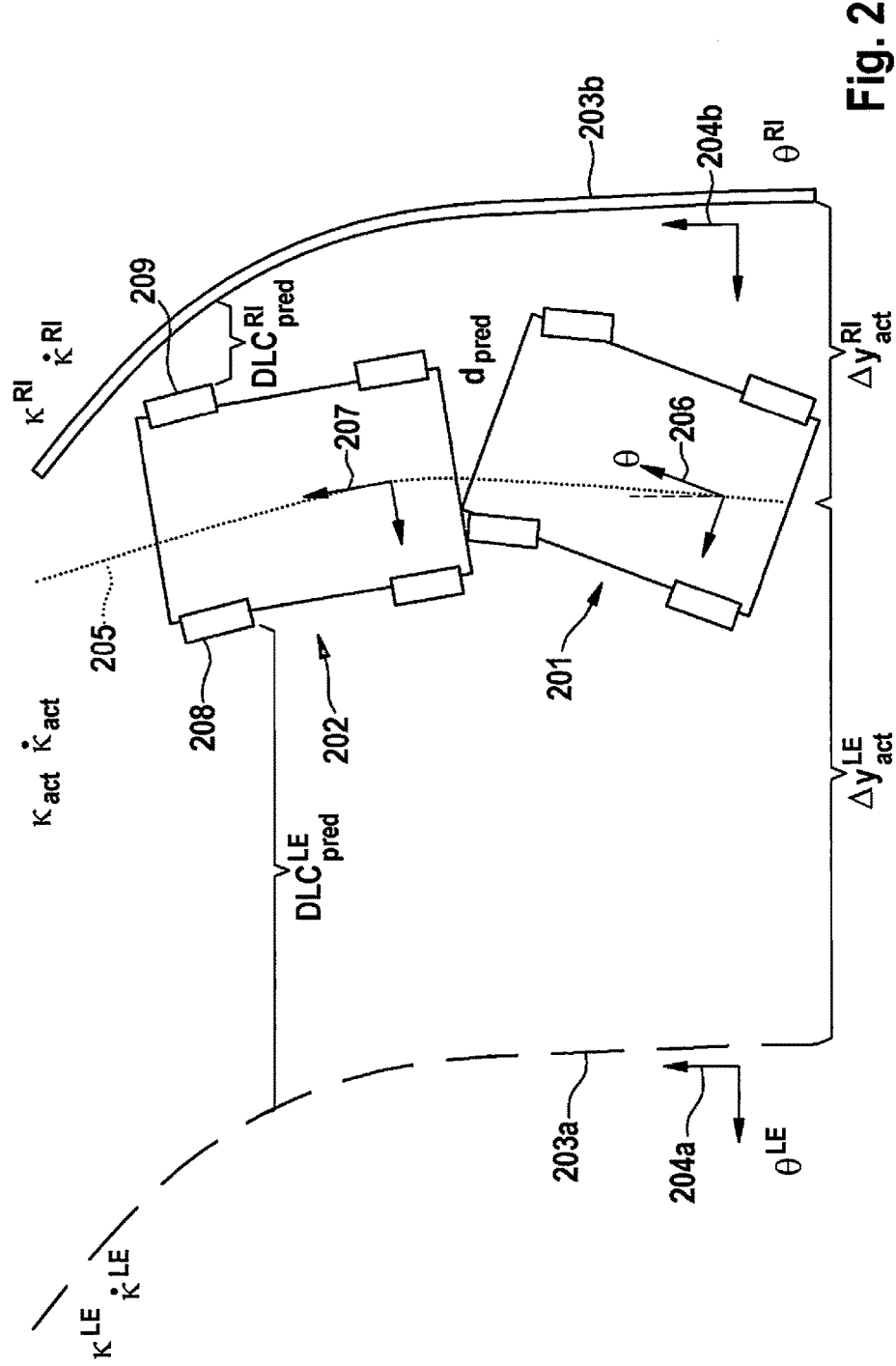
FIG. 2 illustrates variables for characterizing the driving situation based on a depiction of a vehicle on a roadway.

A vehicle is depicted in FIG. 2 in instantaneous position 201 as well as in a subsequent position 202. The vehicle in subsequent position 202 corresponds to vehicle 201 at a later point in time. Expected variables of the vehicle in subsequent position 202 are predicted based on the vehicle in instantaneous position 201.

Vehicle 201 moves along a trajectory 205. Each vehicle 201, 202 has a separate coordinate system 206, 207. Trajectory 205 of host vehicle 201 is described at each point by curvature $\kappa_{act}$ instantaneously present at this point, as well as by the change of curvature $\dot{\kappa}_{act}$ instantaneously present at this point. The change of curvature $\dot{\kappa}_{act}$ is a curvature change along trajectory 205.

The lane in which the vehicle moves is bound by boundaries 203a,b. The right and left boundaries each exhibit a curvature $\kappa^{RI}$ and a curvature $\kappa^{LE}$. In addition, boundaries 203a,b may be described based on the change of their respective curvature $\dot{\kappa}^{LE}$ and $\dot{\kappa}^{RI}$. Boundaries may be roadway markings, roadway boundaries or other profiles indicating the expanse of the roadway. Visual boundaries as well as structural boundaries may be present.

An angle θ, which describes the angle between the respective vehicle coordinate system 206 and coordinate systems 204a,b of the roadway boundaries, may be established based in each case on the respective vehicle coordinate system 206, 207, and based in each case on right and left coordinate system 204a, 204b of roadway boundary 203a,b.

Thus, an angle $\theta^{LE}$ between coordinate system 204a of left roadway boundary 203a and vehicle coordinate system 206 may be determined.

An angle $\theta^{RI}$ between coordinate system 204b of right roadway boundary 203b and vehicle coordinate system 206 may also be determined.

The vehicle in instantaneous position 201 may be established in its position relative to roadways 203a,b by two distances $\Delta y_{act}^{LE}$ and $\Delta y_{act}^{RI}$ the right and left distance relative to roadway boundary 203a,b, respectively, based on the origin of coordinate system 206 of the vehicle in instantaneous position 201, Lane boundaries 203a,b may be detected with the aid of sensors, for example, with the aid of a video camera. The respective curvature of the roadway boundaries may be approximated with the aid of so-called clothoid models.

For the roadway curvature, this yields $$\kappa_1 = \kappa_0 + \dot{\kappa} \cdot S$$

where $\kappa_0$ corresponds to the instantaneous curvature, $\kappa_1$ corresponds to the curvature in distance S. Distance S in this case is the distance in the x-direction of coordinate system 204a or 204b.

The ego-motion of the vehicle is ascertained with the aid of the present yaw rate of the vehicle. Yaw rate refers to the rotation rate of the vehicle about its vertical axis. The ego-motion of the vehicle is also understood to mean the direction in which the vehicle is instantaneously moving along the vehicle trajectory.

The yaw rate signal may be provided by a vehicle dynamics control system such as, for example, an ESP system. Alternatively, the yaw rate signal may also be calculated from the visual flow ascertained with the video camera. A determination with the aid of a specifically provided sensor is also possible.

With the aid of the yaw rate and the ego-velocity of the vehicle $v_{ego}$, it is possible to determine the instantaneously present curvature of vehicle trajectory 205.

$$\kappa_{act} = \frac{yawrate}{v_{ego}}$$

Additional vehicle-specific variables, which may be used below, are length $l_{wheelbase}$, which refers to the center distance between the front and the rear axle, as well as length $l_{carwidth}$, which corresponds to the front wheelbase of wheels 208, 209 of the vehicle. Wheels 208, 209 are provided with reference numerals in FIG. 2 only in subsequent position 202.

The subsequent position of vehicle 202 may be predetermined based on a calculation of the described variables of the vehicle at its instantaneous position 201, as well as of the vehicle in relation to the roadway boundaries. This predictive ascertainment yields a variable DLC, the so-called "distance to lane crossing". FIG. 2 shows variable DLC twice: once as $DLC_{pred}^{LE}$ and once as $DLC_{pred}^{RI}$. $DLC_{pred}^{LE}$ refers to the distance of left front wheel 208 to left roadway boundary 203a of the vehicle at subsequent position 202. $DLC_{pred}^{RI}$ refers to the distance of right front wheel 209 to right roadway boundary 203b of the vehicle at subsequent position 202.

Variables DLC represent a measure of the approach of each front wheel 208, 209 to boundaries 203a, 203b. DLC may also be referred to as the distance variable or approach variable. Approach variable DLC is determined with the aid of the clothoid formula as follows, in this case by way of example of the approach variable of the left front wheel.

$$DLC_{pred}^{LE} = \Delta y_{act}^{LE} + \tan(\theta^{LE}) \cdot d_{pred} + \frac{(\kappa^{LE} - \kappa_{act}) \cdot d_{pred}^2}{2} + \frac{(\dot{\kappa}^{LE} - \dot{\kappa}_{act}) \cdot d_{pred}^3}{6} - \frac{l_{carwidth}}{2}$$

Thus, approach variable $DLC_{pred}^{LE}$ results from an instantaneous distance of the vehicle to roadway boundary $\Delta y_{act}^{LE}$, from angle $\theta^{LE}$ between the roadway boundary and the vehicle, from prediction length $d_{pred}$, from curvature difference $(K^{le} - K_{act})$ of roadway boundary 203a and from trajectory 205, from the difference between curvature changes $(\dot{\kappa}^{LE} - \dot{\kappa}_{act})$ and wheelbase $l_{car\ width}$.

More precisely, the approach variable results from a sum of:

instantaneous distance of the vehicle to roadway boundary $\Delta y_{act}^{LE}$ the tangent of angle $\theta^{LE}$ multiplied by prediction length $d_{pred}$ half the curvature difference $(\kappa^{LE} - \kappa_{act})$ multiplied by the second power of prediction length $d_{pred}$ a sixth of the difference of curvature changes $(\dot{\kappa}^{LE} - \dot{\kappa}_{act})$ multiplied by the third power of prediction length $d_{pred}$ minus half vehicle length $l_{carwidth}$.

Prediction length $d_{pred}$ results from the ego-velocity $V_{ego}$ of the vehicle, multiplied by prediction time $t_{pred}$, which is then added to wheelbase $l_{wheelbase}$ of the vehicle as follows:

$$d_{pred} = V_{ego} \cdot t_{pred} + l_{wheelbase}.$$

Prediction time $t_{pred}$ may be varied. Prediction time $t_{pred}$ may be set, depending on the latencies prevailing in the overall system or also as a function of customer requirements. One value for prediction time $t_{pred}$, for example, is 700 ms. Based on this variable, it is possible, even during use of the vehicle, to adjust to whether an earlier warning or a later warning is desired. The consideration of wheel base $l_{wheelbase}$ is significant, particularly in longer vehicles. For small angles, the tangent function of the angle may be replaced approximately by the angle itself.

Prediction length $d_{pred}$ may also be varied regardless of the calculation shown. A situation may be present in which the sensors for detecting the roadway boundaries are unable to detect or fully detect the boundaries. Such a situation may occur, for example, if other vehicles cover the detection range of the sensors or disrupt the detection, or also if the visibility is poor. In such a situation, it is possible to shorten the prediction length. In this way, an extreme prediction error is prevented, which could result in undesirable system responses. The prediction length is altered as a function of the expanse of the detection range.

The prediction length may be adapted by forming the minimum from the comparison of the previous prediction length, calculated at least from ego-velocity $V_{ego}$ and prediction time $t_{pred}$, and a detection length $d_{sens}$. Detection length $d_{sens}$ corresponds to the detection width of the sensor used, in other words, the length detectable by the sensor. The determination is as follows: $d_{pred} = \min(V_{ego} \cdot t_{pred}, d_{sens})$. Variable $l_{wheelbase}$ may also be considered in this determination. Prediction length $d_{pred}$ may subsequently be restored to the initial value.

Variable $DLC_{pred}^{LE}$ ascertained in this way is positive if the corresponding vehicle wheel is located within the corresponding roadway boundary, and is negative in the event that it is located outside the corresponding roadway boundary.

The depicted ascertainment of approach variable $DLC_{pred}^{LE}$ of the left front wheel may similarly also takes place for the right front wheel. Accordingly, for $DLC_{pred}^{RI}$, this results in:

$$DLC_{pred}^{RI} = -\left(\Delta y_{act}^{RI} + \tan(\theta^{RI}) \cdot d_{pred} + \frac{(\kappa^{RI} - \kappa_{act}) \cdot d_{pred}^2}{2} + \frac{(\dot{\kappa}^{RI} - \dot{\kappa}_{act}) \cdot d_{pred}^3}{6}\right) - \frac{l_{carwidth}}{2}$$

Variable $DLC_{pred}$ ascertained in this way is also positive if the corresponding vehicle wheel is located within the corresponding roadway boundary, and negative in the event that it is located outside the corresponding roadway boundary.

Figure 1:
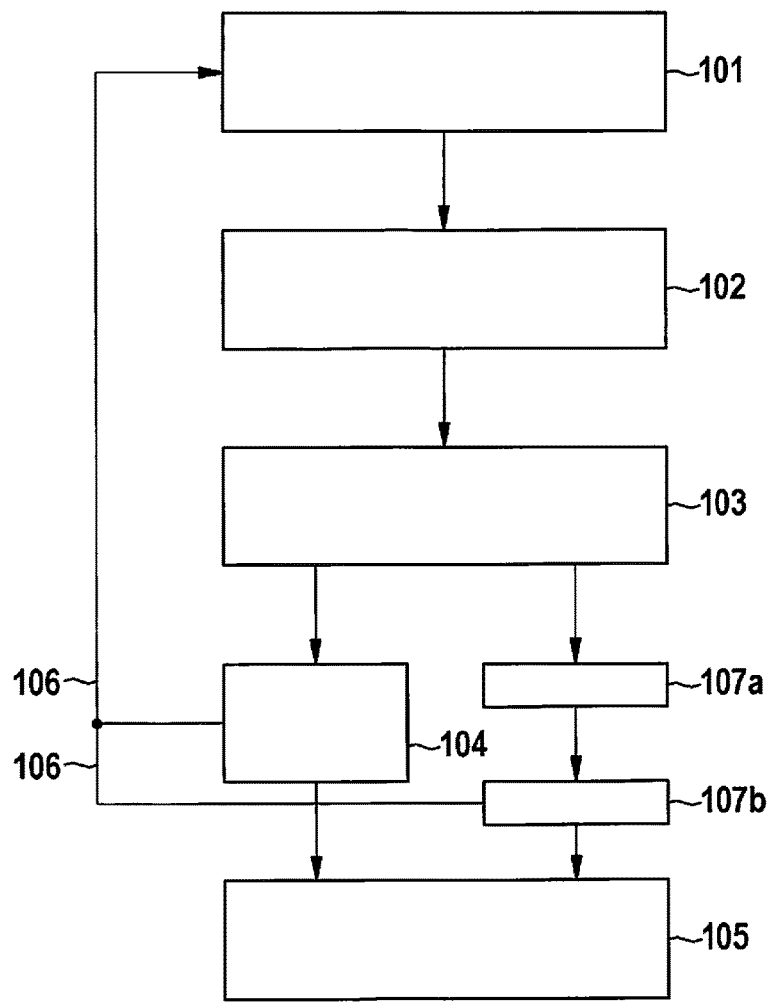
FIG. 1 shows the sequence of a method according to the present invention.

FIG. 1 shows the sequence of the method according to the present invention.

In a first step 101, the roadway is analyzed based on roadway boundaries 203a and/or 203b. The results for each analyzed roadway boundary 203a and/or 203b based on the analysis are the instantaneous distance of the coordinate systems of roadway boundary 204 a and/or b relative to coordinate system 206 of vehicle 201: $\Delta y_{act}^{LE}$ and/or $\Delta y_{act}^{RI}$, the instantaneous angle between the coordinate systems of roadway boundary 204a and/or b relative to coordinate system 206 of vehicle 201: $\theta^{LE}$ and/or $\theta^{RI}$, the curvature: $K^{RI}$ and/or $K^{LE}$, the curvature change: $\dot{\kappa}^{LE}$ and/or $\dot{\kappa}^{RI}$.

The cited variables $\Delta y_{act}^{LE}$, $\Delta y_{act}^{RI}$, $\theta^{LE}$, $\theta^{RI}$, $\kappa^{RI}$, $\kappa^{LE}$, $\dot{\kappa}^{LE}$ and $\dot{\kappa}^{RI}$ are all variables, which are assigned to a lane of the vehicle and which may also be referred to as lane characteristics.

It is not absolutely necessary to analyze both roadway boundaries. A one-sided analysis—with respect only to left roadway boundary 203a or with respect only to right roadway boundary 203b—is conceivable. It is also possible to examine both roadway boundaries 203a and 203b.

In a second step 102, the instantaneous driving situation of the vehicle is ascertained. This is achieved by determining:

instantaneous curvature $K_{act}$ from instantaneous ego-velocity $V_{ego}$ and the instantaneous yaw rate, instantaneous curvature change $\dot{\kappa}_{act}$ These variables stand for the instantaneous driving situation of vehicle 201 and may be referred to as driving situation variables $K_{act}$, $V_{ego}$, yaw rate and $\dot{\kappa}_{act}$.

In a step 103, approach variable $DLC_{pred}$ is ascertained from the lane characteristics and from the driving situation variables, as previously shown above. The ascertainment may take place for only one approach variable $DLC_{pred}^{RI}$ or $DLC_{pred}^{LE}$, as well as for two approach variables $DLC_{pred}^{RI}$ and $DLC_{pred}^{RI}$ together.

If only one approach variable is ascertained, this variable is set equal to a value $DLC_{pred}$ in a step 104. The ascertained approach variable may also be directly used again without setting it as $DLC_{pred}$.

The additional relevant variables $d_{pred}$, $t_{pred}$, $l_{wheelbase}$ for ascertaining approach values $DLC_{pred}^{RI}$ and/or $DLC_{pred}^{RI}$ are stored and are used in the method for calculation. Approach variable $DLC_{pred}$ is compared in step 104 to a threshold value. The method continues to step 105 if the threshold value is not reached.

If both approach variables $DLC_{pred}^{RI}$ and $DLC_{pred}^{RI}$ are ascertained in step 103, a minimum value determination $DLC_{pred}=MIN(DLC_{pred}^{LE}, DLC_{pred}^{RI})$ is then made in step 107a by comparing the two approach variables. Thus, value $DLC_{pred}$ corresponds to the smaller of the two approach values $DLC_{pred}^{RI}$ and $DLC_{pred}^{RI}$. Approach value $DLC_{pred}$ is compared to a threshold value in step 107b. The method continues in step 105 if the approach value does not reach the threshold value.

If the threshold value for the approach variable is not reached, the method in step 106 then continues again to step 101. The return path to step 101 occurs both in the variant in which only one approach value is used in step 104, as well as in the variant in which two approach values are used in steps 107a and 107b.

If approach variable $DLC_{pred}$ does not reach the threshold value, an information signal is then provided in step 105. Subsequent actions may then be taken, based on the information signal. Subsequent actions may be, but are not limited to, for example, warnings to the driver, braking interventions, steering interventions, velocity adjustments, interventions in a longitudinal control or vehicle dynamics interventions.

The threshold value used in steps 104 or 107b may be variably configured. Based on the threshold value, the system may be adjusted in terms of how soon the information signal should be output. In other words, it may be established based on the threshold value up to which approach variable $DLC_{pred}$ a driving situation may be classified as still nonhazardous, and as of which approach variable $DLC_{pred}$ an action (warning and/or subsequent actions) is necessary. Such a threshold value may, in particular, also be set to 0, corresponding to a completed approach to the roadway boundary.

An adaptation of the prediction length to the detection range of the at least one sensor for detecting the roadway boundaries, as previously described, is not shown in FIG. 2, but is conceivable at any time. The adaptation of prediction length $d_{pred}$ to the detection range may also be carried out with the aid of a control unit described below.

Figure 3:
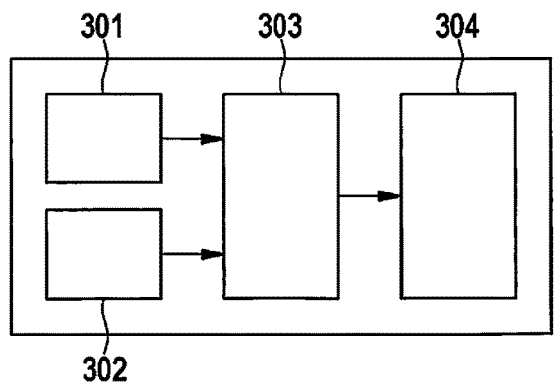
FIG. 3 shows a control unit for carrying out the method according to the present invention in a first embodiment.

FIG. 3 shows a control unit for carrying out the method.

In a first subunit 301 of the control unit, lane characteristics $\Delta y_{act}^{LE}$, $\Delta y_{act}^{RI}$, $\theta^{LE}$, $\theta^{RI}$, $\kappa^{RI}$, $\kappa^{LE}$, $\dot{\kappa}^{LE}$ and $\dot{\kappa}^{RI}$ are ascertained.

In a second subunit 302 of the control unit, driving situation variables $K_{act}$, $V_{ego}$, yaw rate and $\dot{\kappa}_{act}$ are ascertained. First and second subunits 301 and 302 convey the variables to a third subunit 303, in which approach variable $DLC_{pred}$ is ascertained. Additional relevant variables $d_{pred}$, $t_{pred}$, $l_{wheelbase}$ for ascertaining approach values $DLC_{pred}^{RI}$ and/or $DLC_{pred}^{RI}$ are stored and are used in the method for calculation.

Approach variable $DLC_{pred}$ is compared to the previously cited threshold value. As a function of the comparison, an information variable is generated in an output unit 304 when the threshold value is not reached. This variant of the control unit is used to carry out the method according to path 104 with the ascertainment of only one single approach variable for only one roadway boundary of one side.

The described minimum value ascertainment from path 107 of the method does not have to be implemented in this control unit. It may also be sufficient, therefore, to ascertain only the variables of one side of the roadway boundaries in first subunit 301 of the control unit and to also determine only the approach variable for this side of the roadway boundary in third subunit 303.

Figure 4:
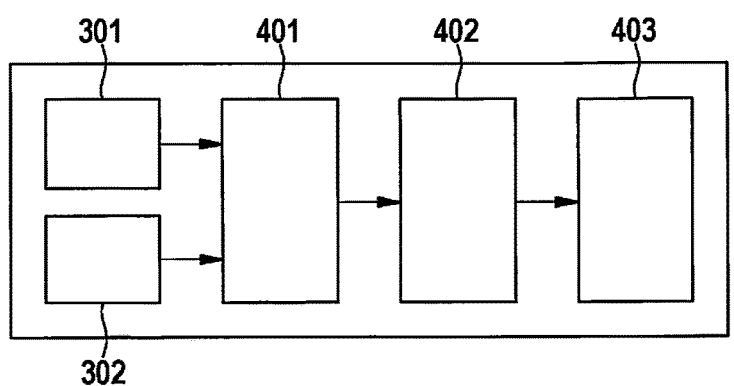
FIG. 4 shows a control unit for carrying out the method according to the present invention in a second embodiment.

FIG. 4 shows a control unit, which is able to carry out the method according to path 107, i.e. while taking both sides of roadway boundary 203a and 203b into consideration.

Steps 301 and 302 remain identical to those in the control unit from FIG. 3, except that at this point the variables of both sides of the roadway boundary must be evaluated.

In third subunit 401, two approach variables are ascertained. The minimum value ascertainment of the approach values, as well as the comparison to the threshold value, takes place in intermediate unit 402. An information variable is generated in output unit 403 if the threshold value is not reached.

Both control units from FIG. 3 or FIG. 4 are able to receive or be supplied with additional variables, for example, the prediction time to be set, the prediction length to be set or the threshold values to be used, and to process them in the respective appropriate units.

In addition, the control units may further provide other systems, control units or subunits via interfaces with variables in addition to the information variable, for example, the approach variables for active lane keeping control as previously mentioned.

The present invention also includes a computer program, which is configured to carry out each step of the method, and an electronic memory medium, on which this computer program is stored. This electronic memory medium is contained in one of the control units described.

What is claimed is:

1. A method for monitoring a lane of a vehicle, the method comprising:
    ascertaining at least one lane characteristic;
    ascertaining at least one driving situation variable representing an instantaneous driving situation of the vehicle in an instantaneous position;
    ascertaining at least one approach variable in a subsequent position of the vehicle from the at least one lane characteristic and from the at least one driving situation variable; and
    at least one of: (i) warning the driver of a predicted vehicle movement based on the approach variable; and (ii) providing a vehicle control intervention to change the vehicle movement based on the approach variable;
    wherein the instantaneous driving situation of the vehicle is ascertained by determining the following: (i) an instantaneous curvature $K_{act}$ from an instantaneous ego-velocity $V_{ego}$ and an instantaneous yaw rate, and (ii) an instantaneous curvature change $\dot{K}_{act}$, and
    wherein the at least one approach variable includes at least one of a left front wheel approach variable and a right front wheel approach variable,
    wherein the left front wheel approach variable is determined with a clothoid formula, for the left front wheel as follows:

$$DLC_{pred}^{LE} = \Delta y_{act}^{LE} + \tan(\theta^{LE}) \cdot d_{pred} + \frac{(\kappa^{LE} - \kappa_{act}) \cdot d_{pred}^2}{2} + \frac{(\dot{\kappa}^{LE} - \dot{\kappa}_{act}) \cdot d_{pred}^3}{6} - \frac{1_{car\ width}}{2},$$

wherein approach variable $DLC_{pred}^{LE}$ results from an instantaneous distance of the vehicle to roadway boundary $\Delta y_{act}^{LE}$, from $\theta_{LE}$ between the roadway boundary and the vehicle, from prediction length $d_{pred}$, from curvature difference ($\kappa^{LE} - \kappa_{act}$) of a roadway boundary and from a trajectory, from a difference between curvature changes ($\dot{\kappa}^{LE} - \dot{\kappa}_{act}$) and a wheelbase $1_{car\ width}$,
wherein the right front wheel approach variable is determined with a clothoid formula, for the right front wheel as follows:

$$DLC_{pred}^{RI} = -(\Delta y_{act}^{RI} + \tan(\theta^{RI}) \cdot d_{pred} + \frac{(\kappa^{RI} - \kappa_{act}) \cdot d_{pred}^2}{2} + \frac{(\dot{\kappa}^{RI} - \dot{\kappa}_{act}) \cdot d_{pred}^3}{6} - \frac{1_{car\ width}}{2},$$

wherein approach variable $DLC_{pred}^{RI}$ results from an instantaneous distance of the vehicle to the roadway boundary $y_{act}^{RI}$, from angle $\theta^{RI}$ between a roadway boundary and the vehicle, from a prediction length $d_{pred}$, from a curvature difference ($\kappa^{RI} - \kappa_{act}$) of the roadway boundary and from a trajectory, from a difference between curvature changes ($\dot{\kappa}^{RI} - \dot{\kappa}_{act}$) and a wheelbase $1_{car\ width}$.

2. The method of claim 1, further comprising:
    comparing the at least one approach variable to a threshold value; and
    outputting an information variable as a function of the comparison of the approach variable to the threshold value.

3. The method of claim 1, wherein the approach value is ascertained predictively, and wherein a prediction length or a prediction time is used as a parameter for the predictive determination of the at least one approach variable.

4. The method of claim 3, wherein the prediction length and the prediction time are linked to one another via the ego-velocity of the vehicle.

5. The method of claim 4, wherein one of the prediction length and the prediction time is variably settable.

6. The method of claim 4, wherein one of the prediction length and the prediction time is variably settable by a driver of the vehicle.

7. The method of claim 3, wherein the at least one lane characteristic is detected with the aid of at least one sensor, the sensor including a detection range, and the prediction length is altered.

8. The method of claim 3, wherein the prediction length and the prediction time are linked to one another via the ego-velocity of the vehicle, in particular, while taking the wheelbase into consideration.

9. The method of claim 3, wherein the at least one lane characteristic is detected with the aid of at least one sensor, the sensor including a detection range, and the prediction length is altered, in particular, reduced, as a function of the expanse of the detection range of the sensor.

10. The method of claim 1, wherein the at least one approach variable is ascertained as a function of the instantaneous distance of a coordinate system of the vehicle at an instantaneous position relative to at least one of the coordinate systems of a roadway boundary, of the instantaneous angle of the coordinate system of the vehicle at the instantaneous position relative to at least one of the coordinate systems of the roadway boundary, of the curvature of at least one roadway boundary, and of the curvature change of at least one roadway boundary as lane characteristics.

11. The method of claim 1, wherein the at least one approach value is ascertained as a function of the instantaneous curvature of a vehicle trajectory, and of the instantaneous curvature change of the vehicle trajectory as a driving situation variable, and wherein the instantaneous curvature is a function of the instantaneous velocity and of the instantaneous yaw rate of the vehicle.

12. The method of claim 1, wherein at least two approach variables are determined, wherein a first approach variable is assigned to a first roadway boundary and a second approach variable is assigned to a second roadway boundary.

13. The method of claim 12, wherein the smaller approach variable of the first approach variable and the second approach variable is ascertained, and the ascertained smaller approach variable is compared to the threshold value.

14. The method of claim 12, wherein the first approach value and the second approach value are provided as output variables to a lane-keeping system and are used as input variables for this system.

15. A control unit for monitoring a lane of a vehicle, comprising:

a first subunit for ascertaining at least one lane characteristic;

a second subunit for ascertaining at least one driving situation variable representing an instantaneous driving situation of the vehicle in an instantaneous position;

a third subunit for ascertaining at least one approach variable in a subsequent position of the vehicle from the at least one lane characteristic and from the at least one driving situation variable; and at least one of: (i) warning the driver of a predicted vehicle movement based on the approach variable; and (ii) providing a vehicle control intervention to change the vehicle movement based on the approach variable;

wherein the instantaneous driving situation of the vehicle is ascertained by determining the following: (i) an instantaneous curvature $K_{act}$ from an instantaneous ego-velocity $V_{ego}$ and an instantaneous yaw rate, and (ii) an instantaneous curvature change $\dot{\kappa}_{act}$, and wherein the at least one approach variable includes at least one of a left front wheel approach variable and a right front wheel approach variable, wherein the left front wheel approach variable is determined with a clothoid formula, for the left front wheel as follows:

$$DLC_{pred}^{LE} = \Delta y_{act}^{LE} + \tan(\theta^{LE}) \cdot d_{pred} + \frac{(\kappa^{LE} - \kappa_{act}) \cdot d_{pred}^2}{2} + \frac{(\dot{\kappa}^{LE} - \dot{\kappa}_{act}) \cdot d_{pred}^3}{6} - \frac{1_{car\,width}}{2},$$

wherein approach variable $DLC_{pred}^{LE}$ results from an instantaneous distance of the vehicle to roadway boundary $\Delta y_{act}^{LE}$, from angle $\theta^{LE}$ between the roadway boundary and the vehicle, from prediction length $d_{pred}$, from curvature difference $(\kappa^{LE} - \kappa_{act})$ of a roadway boundary and from a trajectory, from a difference between curvature changes $(\dot{\kappa}^{LE} - \dot{\kappa}_{act})$ and a wheelbase $1_{car\,width}$, wherein the right front wheel approach variable is determined with a clothoid formula, for the right front wheel as follows:

$$DLC_{pred}^{RI} = -(\Delta y_{act}^{RI} + \tan(\theta^{RI}) \cdot d_{pred} + \frac{(\kappa^{RI} - \kappa_{act}) \cdot d_{pred}^2}{2} + \frac{(\dot{\kappa}^{RI} - \dot{\kappa}_{act}) \cdot d_{pred}^3}{6} - \frac{1_{car\,width}}{2},$$

wherein approach variable $DLC_{pred}^{RI}$ results from an instantaneous distance of the vehicle to the roadway boundary $\Delta y_{act}^{RI}$, from angle $\theta^{RI}$ between a roadway boundary and the vehicle, from a prediction length $d_{pred}$, from a curvature difference $(\kappa^{RI} - \kappa_{act})$ of the roadway boundary and from a trajectory, from a difference between curvature changes $(\dot{\kappa}^{RI} - \dot{\kappa}_{act})$ and a wheelbase $1_{car\,width}$.

16. The control unit of claim 15, wherein in the third subunit the at least one approach variable is compared to a threshold value, further comprising:

an output unit to output an information variable as a function of the comparison of the approach variable to the threshold value.

17. The control unit of claim 15, wherein in the third subunit, two approach variables are ascertained, the smaller approach variable of the first approach variable and of the second approach variable is ascertained in an intermediate unit, the ascertained smaller approach variable is compared to the threshold value, further comprising:

an output unit to output an information variable as a function of the comparison of the approach variable to the threshold value.

* * * * *